US010478921B2

(12) United States Patent
Arjakine et al.

(10) Patent No.: US 10,478,921 B2
(45) Date of Patent: Nov. 19, 2019

(54) LASER BUILD-UP WELDING OF HIGH HEAT RESISTANT SUPER ALLOYS BY MEANS OF OSCILLATING BEAM GUIDANCE

(71) Applicants: Siemens Aktiengesellschaft, München (DE); Fraunhofer Gesellschaft zur Förderung der angewandten Forschung e.V., München (DE)

(72) Inventors: Nikolai Arjakine, Berlin (DE); Georg Bostanjoglo, Berlin (DE); Bernd Burbaum, Falkensee (DE); Stefanie Linnenbrink, Kreuzau (DE); Frank Mentzel, Aachen (DE); Michael Ott, Mülheim an der Ruhr (DE); Sebastian Piegert, Lübbenau (DE); Norbert Pirch, Aachen (DE); Andres Gasser, Aachen (DE)

(73) Assignees: Siemens Aktiengesellschaft (DE); Fraunhofer Gesellschaft zur Förderung der angewandten Forschung e.V. (DE)

( * ) Notice: Subject to any disclaimer, the term of this patent is extended or adjusted under 35 U.S.C. 154(b) by 312 days.

(21) Appl. No.: 15/129,888

(22) PCT Filed: Mar. 6, 2015

(86) PCT No.: PCT/EP2015/054716
§ 371 (c)(1),
(2) Date: Sep. 28, 2016

(87) PCT Pub. No.: WO2015/150019
PCT Pub. Date: Oct. 8, 2015

(65) Prior Publication Data
US 2017/0144252 A1    May 25, 2017

(30) Foreign Application Priority Data

Apr. 1, 2014  (DE) .................. 10 2014 206 143

(51) Int. Cl.
*B23K 26/00* (2014.01)
*B23K 26/342* (2014.01)
(Continued)

(52) U.S. Cl.
CPC ............ *B23K 26/342* (2015.10); *B23P 6/007* (2013.01); *F01D 5/005* (2013.01); *F01D 5/12* (2013.01);
(Continued)

(58) Field of Classification Search
CPC ............ B23K 26/342; B23K 2101/001; B23K 2103/26; B23P 6/007; F05D 2310/31; F01D 5/005; F01D 5/12; F01D 5/20; F01D 9/02
See application file for complete search history.

(56) References Cited

U.S. PATENT DOCUMENTS 5,552,575 A * 9/1996 Doumanidis ........ B23K 9/0953
219/121.14
6,024,792 A   2/2000 Kurz et al.
(Continued)

FOREIGN PATENT DOCUMENTS

| CN | 102126104 A | 7/2011 |
| CN | 102612421 A | 7/2012 |

(Continued)

OTHER PUBLICATIONS

International Search Report for PCT Application No. PCT/EP2015-054716, dated Jun. 23, 2015.
(Continued)

*Primary Examiner* — Alexander M Valvis
(74) *Attorney, Agent, or Firm* — Schmeiser, Olsen & Watts LLP

(57) ABSTRACT

A method for generating, in layers, an application structure made of high heat resistant super alloys on a substrate is provided. A powdery construction material is melted by an energy beam at a working point, wherein the working point is guided across the substrate along a primary movement direction and thus swings transversely to the primary movement direction. The working point thereby swings from a first edge of a respective layer of the application structure to a second edge of the layer. In this way, a time interval passes between departure from a respective edge and a return to the respective edge directly following the departure, such that a melt bath on the respective edge solidifies into a paste-like zone during the time interval.

17 Claims, 2 Drawing Sheets

(51) Int. Cl.
| | | |
|---|---|---|
| *B23P 6/00* | (2006.01) | |
| *F01D 5/00* | (2006.01) | |
| *F01D 5/12* | (2006.01) | |
| *F01D 9/02* | (2006.01) | |
| B23K 101/00 | (2006.01) | |
| F01D 5/20 | (2006.01) | |

(52) U.S. Cl.
CPC .......... *F01D 9/02* (2013.01); *B23K 2101/001* (2018.08); *F01D 5/20* (2013.01); *F05D 2220/32* (2013.01); *F05D 2230/31* (2013.01); *F05D 2230/80* (2013.01); *F05D 2240/307* (2013.01); *F05D 2300/175* (2013.01); *Y02T 50/671* (2013.01)

(56) References Cited

U.S. PATENT DOCUMENTS

| | | | |
|---|---|---|---|
| 2012/0285933 A1 | 11/2012 | Arjakine | |
| 2013/0232749 A1 | 9/2013 | Bruck | |
| 2014/0069893 A1* | 3/2014 | Bruck | B23P 6/007 |
| | | | 219/76.14 |
| 2014/0072438 A1* | 3/2014 | Bruck | B23K 26/082 |
| | | | 416/223 R |
| 2015/0048058 A1* | 2/2015 | Bruck | B23K 26/34 |
| | | | 219/76.14 |

FOREIGN PATENT DOCUMENTS

| | | | | |
|---|---|---|---|---|
| EP | 0486489 B1 | 11/1994 | | |
| EP | 0412397 B1 | 3/1998 | | |
| EP | 0786017 B1 | 3/1998 | | |
| EP | 0892090 A1 | 1/1999 | | |
| EP | 1204776 A1 | 5/2002 | | |
| EP | 1306454 A1 | 5/2003 | | |
| EP | 1319729 A1 | 6/2003 | | |
| EP | 2 311 597 A1 | 4/2011 | | |
| EP | 2311597 A1 | 4/2011 | | |
| JP | 2012192423 | * 10/2012 | ............ | B23K 26/00 |
| JP | 2012192423 A | 10/2012 | | |
| WO | WO 9967435 A1 | 12/1999 | | |
| WO | WO 0044949 A1 | 8/2000 | | |

OTHER PUBLICATIONS

Translation of Korean Office Action for Korean application No. 10-2016-7026903, dated Mar. 14, 2018.

Chinese language Office Action and its English translation for Chinese Application No. 201580018514.2, dated May 3, 2017.

* cited by examiner

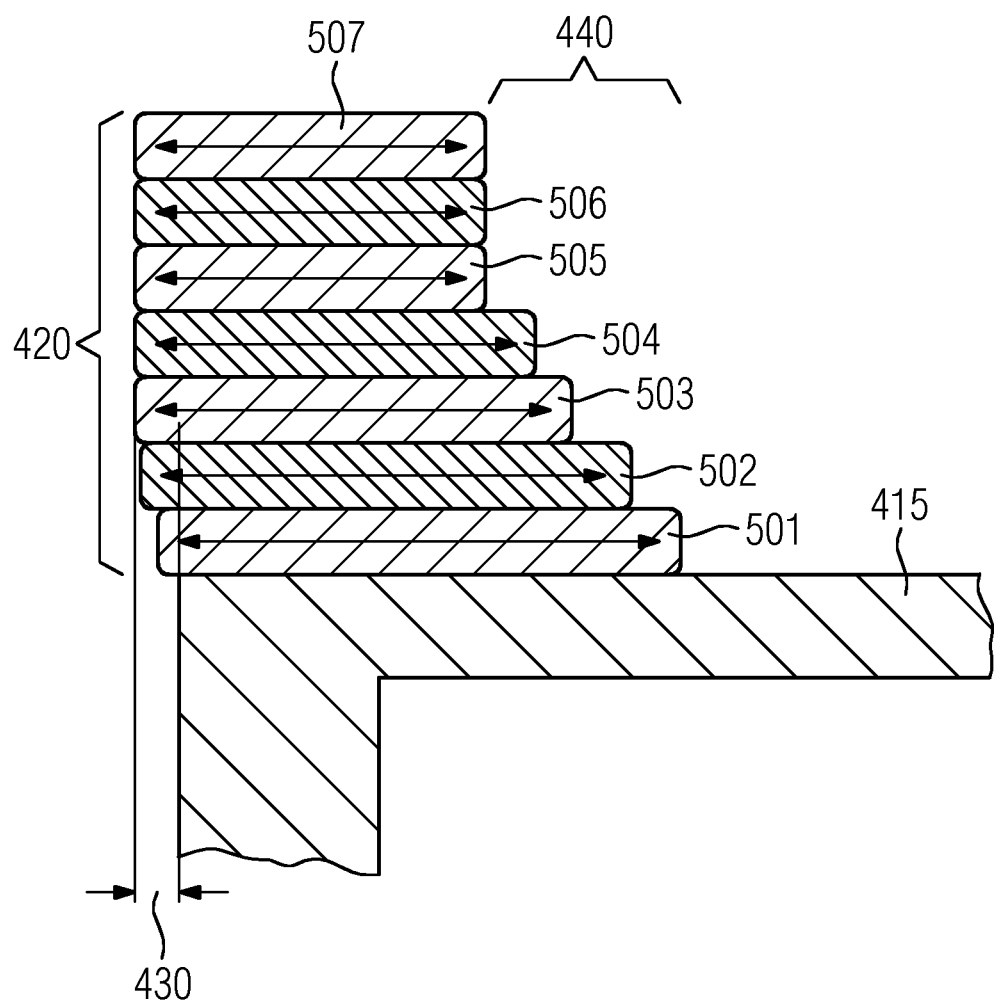

LASER BUILD-UP WELDING OF HIGH HEAT RESISTANT SUPER ALLOYS BY MEANS OF OSCILLATING BEAM GUIDANCE

CROSS-REFERENCE TO RELATED APPLICATIONS

This application claims priority to PCT application Ser. No. PCT/EP2015/054716, having a filing date of Mar. 6, 2015, based off of German application No. 102014206143.1 having a filing date of Apr. 1, 2014, the entire contents of which are hereby incorporated by reference.

FIELD OF TECHNOLOGY

The following relates to a method for the layer-by-layer creation of a deposited structure (deposition structure) made of high-temperature superalloys on a substrate.

BACKGROUND

During operation, rotor blades of gas turbines are subjected to high temperatures and high mechanical loads. For such components, use is therefore preferably made of high-temperature nickel-based superalloys that can be strengthened by precipitation of a $\gamma'$ phase. Nonetheless, over time the rotor blades can develop cracks that widen further over time. Such cracks can for example arise due to the extreme mechanical loading during operation of a gas turbine, but they can also arise during the production process. Since the production of turbine blades and other workpieces from such superalloys is time-consuming and cost-intensive, there is a need to minimize rejects during production and to ensure a long service life of the manufactured products.

In operation, gas turbine blades are serviced regularly and where necessary replaced, if due to operational loading correct operation can no longer be readily guaranteed. In order to permit further use of replaced turbine blades, these are reconditioned as far as possible. They can then once again be used in a gas turbine. Within the context of this type of reconditioning, it may for example be necessary to carry out deposition welding of a deposition structure onto the damaged workpiece in the damaged regions, in order to reproduce the original wall thickness or shape of the workpiece. This can possibly take place after removal of the damaged location, for example by milling.

In addition, turbine blades that have developed cracks in the production process can in this manner be made suitable for use by means of deposition welding, such that it is possible to minimize rejects during production.

However, many high-temperature superalloys can be welded only with difficulty using conventional welding methods. The resulting deposition structures often have unsatisfactory material properties, which can be traced back to the formation of a columnar solidification front during solidification of the material melted in the course of deposition welding.

There is therefore a need for a welding method that is suitable in particular for high-temperature superalloys such as $\gamma'$-hardened nickel-based superalloys and has the above-mentioned drawbacks to a reduced extent, if at all.

SUMMARY

Embodiments of the invention therefore introduces a method for the layer-by-layer creation of a deposition structure made of high-temperature superalloys on a substrate, for example on a workpiece such as a gas turbine blade. In the method, a build-up material containing the high-temperature superalloy is applied to the substrate and is melted by an energy beam in a working point. As energy beam, use can be made in particular of a laser beam, preferably a continuous laser beam. The build-up material can for example be supplied as a powder or as a wire. It is preferably supplied continuously during machining with the energy beam, which can for example take place, in the case of a build-up material in powder form, by means of a carrier gas or, in the case of use of a build-up material in wire form, by advancing the wire.

The working point is guided over the substrate along a main direction of movement and, in the process, oscillates transversely with respect to the main direction of movement. According to embodiments of the invention, the working point then oscillates from a first edge of a respective layer of the deposition structure to a second edge of the respective layer of the deposition structure. In that context, a time span between leaving a respective edge of the first and second edge and returning, immediately after leaving, to the respective edge of the first and second edge is determined such that a melt pool at the respective edge of the first and second edge solidifies, during the time span, to a mushy zone. A mushy zone is defined as a mixture of liquid components and numerous randomly solidified components.

Embodiments of this invention suppress undesired columnar growth, in that a melt pool, formed at a given time and at a given place during the deposition welding, until the return—due to the oscillating motion transversely to the main direction of movement—of the energy beam to this point (or due to the movement in the main direction of movement in the vicinity thereof), re-melts the melt pool that has cooled to a mushy zone.

The oscillating motion transversely to the main direction of movement reduces the expansion of the mushy zone normal to the solidus boundary face, and thus the degree of micro-segregation and precipitation of Laves phases. In addition, it creates solidification conditions that favor globulitic growth. As a consequence of the repeated re-melting of the dendrites, dendrite fragments can remain in the melt and are available as nuclei for the globulitic growth. During deposition welding, globulitic growth in the deposition structure is desired since a deposition structure having columnar growth tends to crack formation.

The motion of the working point along the main direction of movement means that, over time, a given point is heated up less and less by the repeated return of the working point, such that the deposition material applied there can ultimately fully solidify. However, embodiments of the invention has the additional advantage in this context that a given layer of the deposition structure can be built up over its entire width in one pass, it also being possible to create deposition structures with varying widths. Thus, the method according to embodiments of the invention permits particularly rapid completion of the deposition structure that is to be created.

If the method according to embodiments of the invention is used to apply deposition structures of varying width to the substrate, the amplitude of the oscillatory motion transversely to the main direction of movement is increased accordingly. In that context, a velocity of the working point in the main direction of movement can be reduced in the case of increasing width of the deposition structure that is to be created, or increased in the case of decreasing width of the deposition structure that is to be created. In addition or alternatively, the power of the energy beam can be adapted, it being possible to increase the power in the case of increasing width of the deposition structure that is to be created, and to decrease the power in the case of decreasing width of the deposition structure that is to be created.

The working point can for example be guided over the substrate along a sinusoidal path. It is however also possible to let the working point execute an alternating forward-and-backward motion in the main direction of movement, in addition to the motion transversely to the main direction of movement, such that on average there results a movement of the working point in the main direction of movement, but the working point also oscillates relative to the main direction of movement. That means that the working point can for example be moved along the main direction of movement with superposition of a constant-velocity movement and an oscillating movement.

The deposition structure can be formed from a plurality of layers arranged one on top of the other, wherein particularly preferably an edge of a second layer, arranged on a first layer, can project beyond an edge of the first layer. The second layer, projecting beyond the edge of the first layer, is then held at its edge on the basis of surface tension effects during melting by the energy beam. The edge of the second layer can for example project beyond the edge of the first layer by a distance of between 10 and 100 micrometers. The respective possible overhang is then influenced, inter alia, by the diameter of the melt pool. In that context, the oscillation of the working point transversely with respect to the main direction of movement advantageously increases the diameter of the melt pool, and as a result the method according to embodiments of the invention is particularly suitable for creating relatively large overhangs.

The overhang makes it possible to create deposition structures whose edge projects beyond an edge of the substrate by a distance of 100 micrometers or more, which has the advantage that, after the end of the method, the substrate with the deposition structure can be given its final desired shape by milling or similar methods. In that context, if the deposition structure did not project beyond the edge of the substrate, or only did so by less than 100 micrometers, a milling tool then used would not bite or would have to be guided so as to remove more material than desired.

The time span during which the working point is moved from the first edge to the second edge of the respective layer of the deposition structure and back can be between 5 and 100 milliseconds, preferably between 10 and 50 milliseconds. The working point is thus preferably moved many times per second transversely with respect to the main direction of movement from one edge of the processed layer to the other.

An average velocity of the working point along the main direction of movement can be between 100 and 1000 millimeters per minute, preferably between 300 and 700 millimeters per minute. The method according to embodiments of the invention permit a high working rate for creation of the deposition structure. The absolute velocity of the working point is much higher due to the oscillatory motion transversely to the main direction of movement, for example between 2500 and 10 000 millimeters per minute, preferably between 4000 and 8000 millimeters per minute.

A separation between the first and the second edge of the respective layer of the deposition structure is preferably between 1 and 10 millimeters, particularly preferably between 1 and 4 millimeters. The best results can be achieved with deposition structures of this width. For markedly larger widths, the parameters of the method can no longer take on practical values.

The method according to embodiments of the invention are particularly well-suited to the processing of gas turbine components such as guide vanes or rotor blades. For that reason, the substrate is preferably a gas turbine blade, wherein the deposition structure is applied to a tip of the gas turbine blade or to a top or side face of a blade platform of the gas turbine blade. The tip of a gas turbine blade and the blade platform are subject to the greatest wear during operation of a gas turbine.

BRIEF DESCRIPTION

Some of the embodiments will be described in detail, with reference to the following figures, wherein like designations denote like members, wherein:

FIG. 3 shows a partial view of a cross section through a deposition structure created using the method according to embodiments of the invention.

DETAILED DESCRIPTION

Figure 1:
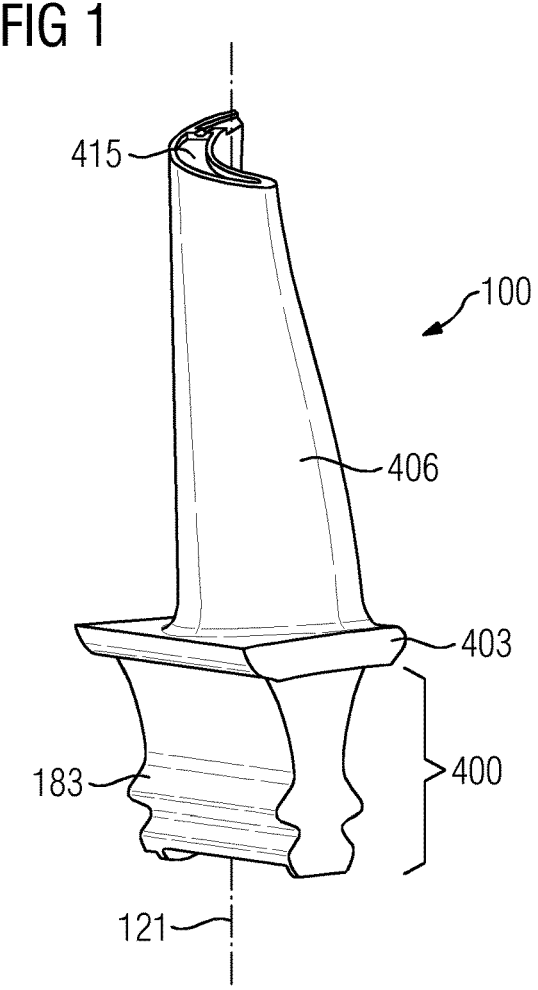
FIG. 1 shows a perspective view of a gas turbine blade of a gas turbine.

FIG. 1 shows a perspective view of a gas turbine blade 100, which can be a rotor blade or a guide vane and which extends along a longitudinal axis 121.

The gas turbine can be used in an aircraft for propulsion or in a power plant for generating electricity.

The blade 100 has, in succession along the longitudinal axis 121, a securing region 400, an adjoining blade platform 403 and a blade airfoil 406 and a blade tip 415.

If the gas turbine blade 100 is designed as a guide vane, it can have, at its blade tip 415, another platform (not shown).

A blade root 183, which is used to secure the gas turbine blade 100 to a shaft or a disk (not shown), is formed in the securing region 400.

The blade root 183 can for example be designed as a hammerhead root, a fir-tree root or a dovetail root.

In the case of conventional blades 100, solid metallic materials, in particular superalloys, are preferably used in all regions 400, 403, 406 of the blade 100. Superalloys of this type are known, for example, from EP 1 204 776 B1, EP 1 306 454, EP 1 319 729 A1, WO 99/67435 or WO 00/44949.

The blade 100 may in this case be produced by a casting process, also by means of directional solidification, by a forging process, by a milling process or combinations thereof Workpieces with single-crystal structure or structures are used as components for machines which, in operation, are subjected to high mechanical, thermal and/or chemical loads, as is the case for gas turbines.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globulitic (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified structures.

Processes of this type are known from U.S. Pat. No. 6,024,792 and EP 0 892 090 A1.

The blade 100 may likewise have coatings protecting against corrosion or oxidation, e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1.

The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier layer, which is preferably the outermost layer and consists for example of ZrO2, Y2O3-ZrO2, i.e. it is unstabilized, partially stabilized or fully stabilized by yttrium oxide and/or calcium oxide and/or magnesium oxide, to be present on the MCrAlX.

The thermal barrier layer covers the entire MCrAlX layer.

Columnar grains are produced in the thermal barrier layer by suitable coating processes, such as for example electron beam physical vapor deposition (EB-PVD).

Other coating processes are possible, for example atmospheric plasma spraying (APS), LPPS, VPS or CVD. The thermal barrier layer may include grains that are porous or have micro-cracks or macro-cracks, in order to improve the resistance to thermal shocks. The thermal barrier layer is therefore preferably more porous than the MCrAlX layer.

Refurbishment means that, after they have been used, protective layers may have to be removed from components such as the gas turbine blade 100 (e.g. by sand-blasting). Then, the corrosion and/or oxidation layers and products can be removed. If appropriate, cracks in the component are also repaired. In particular, it can also be necessary to supplement structures in the region of the blade tip 415 or at the edges of the blade platform 403, in order to reproduce the original, undamaged shape of the gas turbine blade 100. This can be followed by re-coating of the component, after which the component can be reused.

Figure 2:
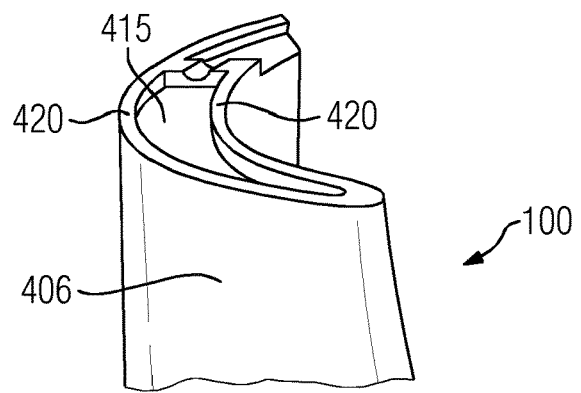
FIG. 2 shows a partial view of the gas turbine blade with deposition structures created using the method according to embodiments of the invention.

FIG. 2 shows a partial view of the gas turbine blade 100 with deposition structures 420 created using the method according to embodiments of the invention. Here, the deposition structure 420 is arranged on the blade tip 415 of the gas turbine blade 100. In the example shown, there are provided two narrow walls that are arranged on opposite edges of the blade tip 415, and each represents, in and of itself, a deposition structure 420. The width and height of the walls can be between half a millimeter and one centimeter. In the case of a rotor blade, the deposition structures 420 can be provided for the purpose of sealing the blade tip 415 against an opposite wall of the gas path. To that end, the geometry of the rotor blade is chosen such that, during operation of the gas turbine, mechanical and thermal expansion lead to contact between the blade tip 415 and the wall, as a consequence of which the blade tip 415 or the deposition structure 420 arranged thereon is worn down exactly to the required extent. At the same time, this creates a tight seal between the blade tip 415 and the wall. During refurbishment, an already worn and revised gas turbine blade can be provided with a new deposition structure 420 in order to be able to carry out the described procedure anew after re-commissioning of the gas turbine.

The method according to embodiments of the invention provides for building up each deposition structure 420 layer by layer, and guiding the energy beam used for melting the powdery build-up material along the long direction of extent of the deposition structure 420 as main direction of movement, wherein the working point is moved with an oscillating motion transversely to the main direction of movement from one edge of the deposition structure 420 to the other. This allows the creation of the deposition structure having the abovementioned advantages.

FIG. 3 shows a partial view of a cross section through a deposition structure 420 created using the method according to embodiments of the invention and comprising a plurality of layers 501 to 507 arranged one on top of the other. It is of course possible for other layers to be provided. The layers 501 to 507 are arranged on the blade tip 415, which serves as the substrate. Applied first is the layer 501, then the layer 502 thereon, and so on. The motion of the working point over the width of each layer 501 to 507 is shown by double arrows in the individual layers 501 to 507. In FIG. 3, the main direction of movement runs into the plane of the figure.

It is clear that the path taken by the working point in that context varies with the width of the layer 501 to 507. Accordingly, the time span that the working point requires for this path can be adapted according to the geometry of the deposition structure 420 that is to be created. The method according to embodiments of the invention makes it possible to create layers 501 to 507 that project beyond an edge of the substrate 415. The distance by which each individual layer can project beyond the underlying layer is in that context limited by the respective build-up material and the geometry of the layer or of the substrate 415. Therefore, it is possible to form a desired overhang 430 over multiple layers 501 to 507, in the present case over those layers 501, 502 and 503 that each project further than the respective structure directly underlying them. It is thus possible, for example, to form an overhang 430 of 100 to 200 micrometers, which is advantageous for subsequent machining of the workpiece using a milling tool or the like. On the opposite side of the deposition structure 420 from the overhang 430, it is possible to form a fillet weld 440, in that the layers 501 to 505 recede on this side of the deposition structure 420 with increasing height. This has the advantage of a more reliable connection between the deposition structure 420 and the substrate 415, and increased stability of the deposition structure 420 since the radius of the fillet weld 440 reduces stresses and thus reduces cracks in the welded material, compared to if the deposition structure were welded on at right angles.

Although the invention has been described and illustrated in greater detail by means of the preferred exemplary embodiment, the invention is not limited by the disclosed The claims are as follows:

1. A method for a layer-by-layer creation of a deposition structure, the deposition structure being made of high-temperature superalloys on a substrate, the method comprising:

applying a build-up material containing the high-temperature superalloys to the substrate, which is melted by an energy beam in a working point, wherein the working point is guided along the substrate in a main direction of movement and, in the process, oscillates transversely with respect to the main direction of movement, wherein the working point oscillates from a first edge of a respective layer of the deposition structure to a second edge of the respective layer of the deposition structure, and a time span between leaving a respective edge of the first edge and the second edge and returning, immediately after leaving, to the respective edge of the first edge and the second edge is determined such that a melt pool at the respective edge of the first edge and the second edge solidifies, during the time span, to a mushy zone.

2. The method of claim 1, wherein the working point is guided at an average velocity along the main direction of movement, further wherein an instantaneous velocity of the working point changes sign.

3. The method of claim 1, wherein the deposition structure is formed from a plurality of layers arranged one on top of the other, and an edge of a second layer, arranged on a first layer, projects beyond an edge of the first layer.

4. The method of claim 3, wherein the edge of the second layer projects beyond the edge of the first layer by a distance of between 10 and 100 micrometers.

5. The method of claim 3, wherein an edge of the deposition structure projects beyond an edge of the substrate by a distance of at least 100 micrometers.

6. The method of claim 1, wherein the time span is between 5 and 100 milliseconds.

7. The method of claim 1, wherein an average velocity of the working point along the main direction of movement is between 100 and 1000 millimeters per minute.

8. The method of claim 1, wherein an absolute velocity of the working point is between 2500 and 10000 millimeters per minute.

9. The method of claim 1, wherein a separation between the first edge and the second edge of the deposition structure is between 1 and 10 millimeters.

10. The method of claim 1, wherein the substrate is a gas turbine blade and the deposition structure is applied to a tip of the gas turbine blade or to a side face of a blade platform of the gas turbine blade.

11. The method of claim 1, wherein the time span is between 10 and 50 milliseconds.

12. The method of claim 1, wherein an average velocity of the working point along the main direction of movement is between 300 and 700 millimeters per minute.

13. The method of claim 1, wherein an absolute velocity of the working point is between 4000 and 8000 millimeters per minute.

14. The method of claim 1, wherein a separation between the first edge and the second edge of the deposition structure is between 1 and 4 millimeters.

15. The method of claim 1, wherein a fillet weld is formed in the deposition structure.

16. The method of claim 1, wherein the deposition structure is at least one wall at an edge of the substrate.

17. The method of claim 1, wherein the main direction of movement of the working point is a horizontal movement along a surface of the substrate.

* * * * *